June 4, 1940.
J. H. REUTHER
2,203,393
MUSICAL INSTRUMENT
Filed July 18, 1939
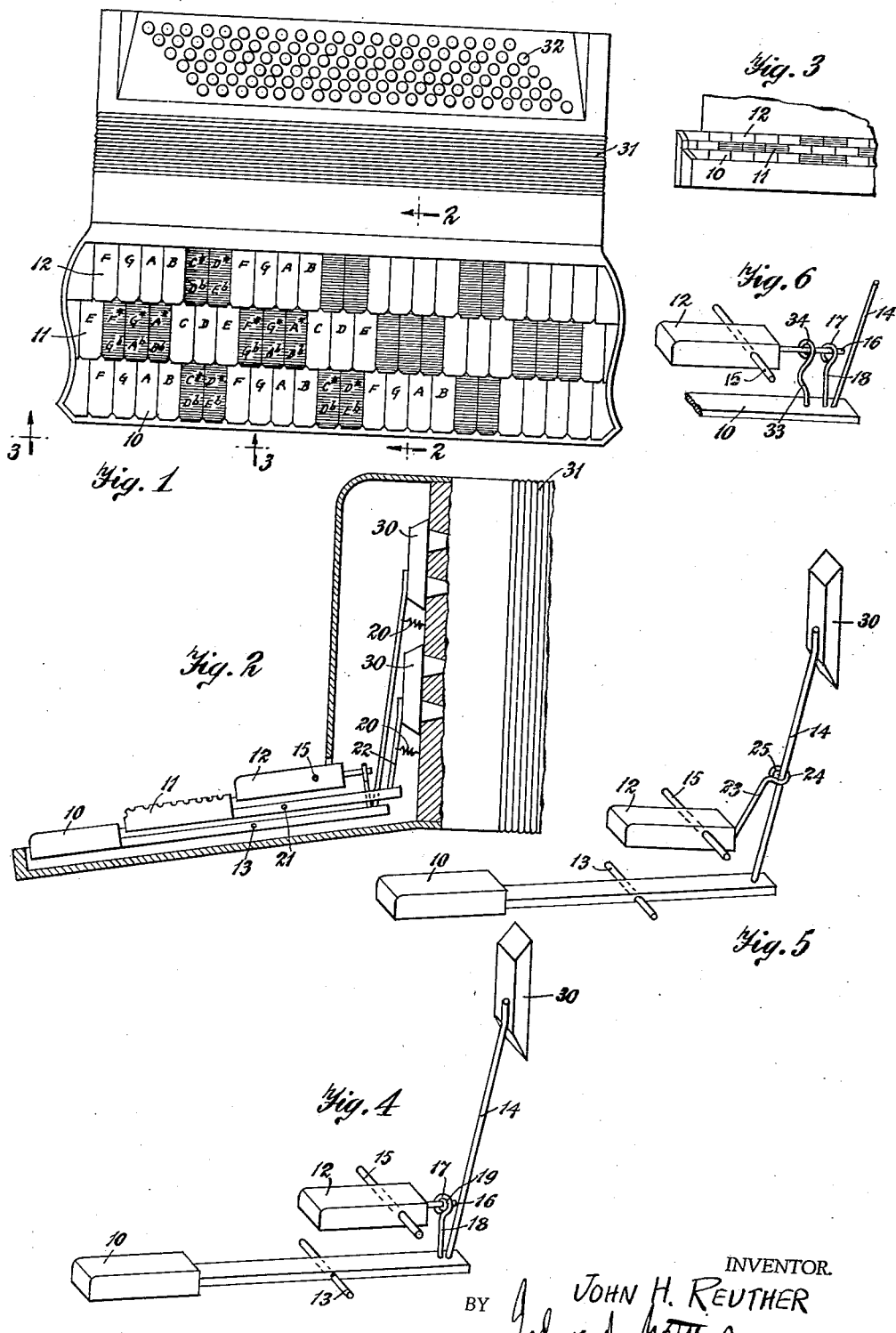
INVENTOR.
JOHN H. REUTHER
BY
ATTORNEY.

Patented June 4, 1940

2,203,393

UNITED STATES PATENT OFFICE 2,203,393

MUSICAL INSTRUMENT

John H. Reuther, New York, N. Y.

Application July 18, 1939, Serial No. 285,105

9 Claims. (Cl. 84—428)

This invention relates to new and useful improvements in musical instruments.

This invention relates, in part, to the same subject matter embodied in my abandoned patent application, Serial No. 596,362, filed March 2, 1932 and entitled "Piano keyboard."

Musicians with broad fingers have difficulty in playing a piano, organ or accordion having a standard black and white keyboard due to the fact that the space between the black keys is too narrow for their fingers. On a keyboard of this type it is easiest to play in the key of C because all the notes that are to be played or manipulated in playing the key of C are the white keys or naturals, which are broad at the front. In playing in any of the other keys, however, some black (flat and sharp) keys as well as white keys have to be used and often the fingers have to be placed between the black keys in playing the white keys because it is inconvenient to play by extending the fingers backwards so as to bring the fingers on the broadest parts of the white keys. When playing the white keys from positions between the black keys the player is at a disadvantage in so far as "touch" is concerned because a different pressure is necessary and the portions of the keys touched moved through a different distance.

One of the objects of this invention, therefore, is to provide a piano or accordion or similar keyboard which may be played conveniently by persons having broad fingers and which will operate with more uniform touch for all persons. It is contemplated to accomplish these objects by using keys of uniform standard widths, that is, the black and the white keys to be of the same widths. It is proposed to arrange these keys in certain rows to facilitate the fingering thereof.

Whereas the standard piano keyboard has two rows of keys consisting of naturals and flats and sharps, this invention proposes a keyboard with three distinct rows of keys, the keys in the first and third rows arranged in certain specific relationship to each other as hereinafter more fully explained.

At this point it may be well to point out that the fingers of the human hand are so constructed that they may easily reach forwards and conveniently play a key, but the fingers are not very well adapted to reach rearwards and play a key. For this reason this invention contemplates associating the first and third rows with each other in a manner so that identical notes may be played either from the first or the third rows of keys.

An important and dominating feature of this invention resides in a certain construction which will permit the keys in each of the three rows to move downwards uniform distances and to require uniform pressures for playing the keys. A construction of this type will not interfere with the "feel" or "touch" of a player. It is pointed out that if it requires different pressures to play keys of the different rows, and each of these keys work through different distances, it requires more than ordinary skill on the part of a player to operate the keys so as to uniformly play the various tones of the instrument.

Still further the invention proposes constructing the black keys in a manner so that they may be distinguished by touch from the white keys to assist a player in playing the instrument.

Still further the invention proposes the construction of a device as described which is simple and durable and which may be manufactured and sold at a reasonable cost.

For further comprehension of the invention, and of the objects and advantages thereof, reference will be had to the following description and accompanying drawing and to the appended claims in which the various features of the invention are more particularly set forth.

In the accompanying drawing forming a material part of this disclosure:

Fig. 1 is a plan view of an accordion with a piano keyboard constructed according to this invention.

Fig. 2 is a fragmentary vertical sectional view taken on the line 2—2 of Fig. 1.

Fig. 3 is a fragmentary elevational view looking in the direction of the line 3—3 of Fig. 1.

Fig. 4 is a perspective view of one key from the first row of keys and the corresponding key from the third row of keys, and the connecting mechanism used to operate the same note with these keys.

Fig. 5 is a perspective view similar to Fig. 4 but showing a modified arrangement for accomplishing the same purpose.

Fig. 6 is a fragmentary perspective view similar to Fig. 4 but illustrating a modified construction.

The invention is shown applied to an accordion, but this is only by way of illustration. It should be borne in mind that it may be applied with equal force to various other types of instruments. So that the drawing may easily be identified, it is pointed out that the accordion illustrated is of standard construction up to the keyboard, and the mechanism for operating the note operators of the instrument. The accordion has a standard bass section 32, standard bellows 31 and standard reeds (not illustrated on the drawing) operated by the valves 30. The new keyboard is connected with the valves 30 to accomplish the objects of this invention.

The keyboard, according to this invention, has a proximal row of depressible keys 10, an intermediate row of depressible keys 11, and a distal row of depressible keys 12. In the particular design shown on the drawing each octave on the keyboard is made up of six keys in one row and six keys in an adjacent row, making a total of twelve keys for each octave. In a standard piano keyboard each octave is composed of five black keys and seven white keys. In the proximal row there are four white keys followed by two black keys. In the intermediate row there are three white keys followed by three black keys. In the distal row there are four white keys followed by two black keys. It should be noted that the keys in the proximal row and the distal row represent identical notes. These keys are interconnected with each other in a specific manner.

The keys in the proximal row are supported by a pintle shaft 13 arranged at a point with respect to the body of the accordion so that the front end of the key may be depressed a certain distance to play the note, as for example one-quarter of an inch. The inner end of each key from the proximal row of keys supports a rod 14 which is connnected with the valve 30 for the particular note. Thus the valve 30 is moved a certain distance when the key is depressed. Each of the keys of the distal row is pivotally supported by a pintle rod 15. Each key in the distal row 12 is capable of being depressed the same distance as each key in the proximal row. Each key in the distal row is connected to operate the same valve 30 under the same pressure, moving the valve the same distance as its corresponding key in the proximal row. One method of accomplishing this is to have a rod 16 projecting from the inner end of each key in the distal row and engaging through a loop 17 of a rod 18 which is mounted upon or connected with the inner end of the corresponding key from the proximal row. A felt washer 19 is mounted upon the rod 16 and is interposed between the rod and the loop 17 to prevent undue noises. As previously stated, the parts are so designed that the keys operate through the same distances, under the same mechanical advantages. Springs 20 normally urge the valves 30 into their closed positions.

The intermediate rows of keys are pivotally supported by a pintle rod 21. These intermediate rows of keys are so arranged to be depressed the the same distances as the other keys of the instrument. At their inner ends they are provided with rods 22 which connect with the required valves 30 to obtain desired notes.

In Fig. 5 another method has been illustrated for connecting together the keys of the proximal and distal rows of keys to obtain the same mechanical advantage and distance of key travel. In this form each key in the distal row is provided with a rod 23 which has a loop portion 24 engaging around the rod 14 which is connected with the valve 30 and which is mounted upon the inner end of the key from the proximal row. Felt material 25 is interposed between the loop 24 and the rod 14.

The operation of the instrument is as follows:

A person playing the instrument may easily reach each of the notes of the proximal row of keys in the customary manner. When required he may reach forward to any of the keys in the intermediate row. If at this time it is required that a note be played which is in the proximal row, instead of reaching backwards to the proximal row, which is highly inconvenient, he may reach forward to the distal row and in this row play the same note. It should be recognized that each of the keys is of uniform width and that the undesirable feature of requiring a player to reach in between the black keys of a standard piano keyboard to reach portions of the white keys there-between, has been eliminated. Moreover, a player reaching in between the black keys of a standard keyboard would have to strike the white key with a different touch than is usual when striking the white key at its tip because of a difference in mechanical advantage. With the new keyboard there is no difference in mechanical advantage since the keys in each of the rows are designed to give the same mechanical advantage, requiring the same pressure and traveling through the same distances.

In the modification illustrated in Fig. 6 a new and novel means is provided for eliminating possible noises of the keys when operated. In the prior forms noise insulation material, such as felt washers, have been illustrated and described for insulating possible contacting parts which move relative to each other in possible engagement and might cause noises. According to the form of the invention illustrated in Fig. 6 resilient means in the form of a spring is utilized for maintaining continuous contact of certain separable parts which are moved when the keys are operated to prevent clicking of these parts.

In this form of the invention the rear end of each proximal row key 10 is provided with a rod 18 having a loop 17 at its upper end. Each rear end of the keys 10 is also provided with the rod 14 which supports the valve as previously described. Each distal row key 12 has a rearward projecting rod 16 which engages through the loop 17. During operation of the keys there must be some play between the loop 17 and the rod 16 and it is this play which will cause the clicking sounds. To overcome this a leaf spring 33 is mounted on each rear end of each proximal key 10 and extends upwards and has a top loop portion 34 encircling the rod 16. This spring 33 is under compression so that there is always the tendency for the spring 33 to push the loop 34 against the rod 16 and indirectly push the rod 16 against the top of the loop 17. During operation of either the key 10 or the key 12 the spring 33 will always maintain the contact of the rod 16 with the top of the loop 17. This avoids separation of the parts and subsequent striking of the parts and thus eliminates the clicking noise.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new and desire to secure by United States Letters Patent is:

1. In a musical instrument, a keyboard having a proximal row of depressible keys, an intermediate row of depressible keys, and a distal row of depressible keys, a note operator for each key in the intermediate row of keys, means for connecting together for unitary operation said like keys and note operators, a note operator for each pair of keys in said proximal and distal row of keys, means for connecting together for unitary operation said like keys in the proximal row and said latter note operators and articulated to have the keys in the proximal and intermediate rows move like distances and require like pressures to operate the same, and means for connecting together for unitary operation said like keys in the distal row and said latter note operators and articulated to have the keys in the distal row move like distances and require like pressure as the keys in the proximal and intermediate rows.

2. In a musical instrument, a keyboard having a proximal row of depressible keys, an intermediate row of depressible keys, and a distal row of depressible keys, a note operator for each key in the intermediate row of keys, means for connecting together for unitary operation said like keys and note operators, a note operator for each pair of keys in said proximal and distal row of keys, means for connecting together for unitary operation said like keys in the proximal row and said latter note operators and articulated to have the keys in the proximal and intermediate rows move like distances and require like pressures to operate the same, and means for connecting together for unitary operation said like keys in the distal row and said latter note operators and articulated to have the keys in the distal row move like distances and require like pressure as the keys in the proximal and intermediate rows, the keys of each of said rows being of the same width and depth.

3. In a musical instrument, a keyboard having a proximal row of depressible keys, an intermediate row of depressible keys, and a distal row of depressible keys, a note operator for each key in the intermediate row of keys, means for connecting together for unitary operation said like keys and note operators, a note operator for each pair of keys in said proximal and distal row of keys, means for connecting together for unitary operation said like keys in the proximal row and said latter note operators and articulated to have the keys in the proximal and intermediate rows move like distances and require like pressures to operate the same, and means for connecting together for unitary operation said like keys in the distal row and said latter note operators and articulated to have the keys in the distal row move like distances and require like pressure as the keys in the proximal and intermediate rows, said means for connecting together the keys in the proximal row with the latter-mentioned note operators comprise rods connected with the inner ends of the keys and connected with said note operators.

4. In a musical instrument, a keyboard having a proximal row of depressible keys, an intermediate row of depressible keys, and a distal row of depressible keys, a note operator for each key in the intermediate row of keys, means for connecting together for unitary operation said like keys and note operators, a note operator for each pair of keys in said proximal and distal row of keys, means for connecting together for unitary operation said like keys in the proximal row and said latter note operators and articulated to have the keys in the proximal and intermediate rows move like distances and require like pressures to operate the same, and means for connecting together for unitary operation said like keys in the distal row and said latter note operators and articulated to have the keys in the distal row move like distances and require like pressure as the keys in the proximal and intermediate rows, said means for connecting together the keys in the proximal row with the latter-mentioned note operators comprise rods connected with the inner ends of the keys and connected with said note operators, and said means for connecting the keys of the distal row with the latter-mentioned note operators comprise rods connected with the keys of the distal row and connected with elements in turn connected with the inner ends of the keys of the proximal row.

5. In a musical instrument, a keyboard having a proximal row of depressible keys, an intermediate row of depressible keys, and a distal row of depressible keys, a note operator for each key in the intermediate row of keys, means for connecting together for unitary operation said like keys and note operators, a note operator for each pair of keys in said proximal and distal row of keys, means for connecting together for unitary operation said like keys in the proximal row and said latter note operators and articulated to have the keys in the proximal and intermediate rows move like distances and require like pressures to operate the same, and means for connecting together for unitary operation said like keys in the distal row and said latter note operators and articulated to have the keys in the distal row move like distances and require like pressure as the keys in the proximal and intermediate rows, said means for connecting together the keys in the proximal row with the latter-mentioned note operators comprise rods connected with the inner ends of the keys and connected with said note operators, and said means for connecting the keys of the distal row with the latter-mentioned note operators comprise rods connected with the keys of the distal row and connected with elements in turn connected with the inner ends of the keys of the proximal row, said elements comprising rods mounted upon the inner ends of the keys of the proximal row and having loop portions engaged by the rods from the keys of the distal row.

6. In a musical instrument, a keyboard having a proximal row of depressible keys, an intermediate row of depressible keys, and a distal row of depressible keys, a note operator for each key in the intermediate row of keys, means for connecting together for unitary operation said like keys and note operators, a note operator for each pair of keys in said proximal and distal row of keys, means for connecting together for unitary operation said like keys in the proximal row and said latter note operators and articulated to have the keys in the proximal and intermediate rows move like distances and require like pressures to operate the same, and means for connecting together for unitary operation said like keys in the distal row and said latter note operators and articulated to have the keys in the distal row move like distances and require like pressure as the keys in the proximal and intermediate rows, said means for connecting together the keys in the proximal row with the latter-mentioned note operators comprise rods connected with the inner ends of the keys and connected with said note operators, and said means for connecting the keys of the distal row with the latter-mentioned note operators comprise rods connected with the keys of the distal row and connected with elements in turn connected with the inner ends of the keys of the proximal row, the rods from the keys of the distal row having loop portions slidably engaging the rods which connect the keys of the proximal row with the latter-mentioned note operators.

7. A musical instrument, comprising a keyboard having a proximal row of depressible keys, an intermediate row of depressible keys, and a distal row of depressible keys, a note operator for each key in the intermediate row of keys, means for connecting together for unitary operation said like keys and note operators, a note operator for each pair of keys in said proximal and distal row of keys, means for connecting together for unitary operation said like keys in the proximal row and said latter note operators and articulated to have the keys in the proximal and intermediate rows move like distances and require like pressures to operate the same, and means for connecting together for unitary operation said like keys in the distal row and said latter note operators and articulated to have the keys in the distal row move like distances and require like pressure as the keys in the proximal and intermediate rows, said means for connecting together the keys in the proximal row with the latter-mentioned note operators comprise rods connected with the inner ends of the keys and connected with said note operators, and said means for connecting the keys of the distal row with the latter-mentioned note operators comprise rods connected with the keys of the distal row and connected with elements in turn connected with the inner ends of the keys of the proximal row, said elements comprising rods mounted upon the inner ends of the keys of the proximal row and having loop portions engaged by the rods from the keys of the distal row, and resilient means for urging the rods from the keys of the distal row against the loop portions of the rods of the proximal row.

8. A musical instrument, comprising a keyboard having a proximal row of depressible keys, an intermediate row of depressible keys, and a distal row of depressible keys, a note operator for each key in the intermediate row of keys, means for connecting together for unitary operation said like keys and note operators, a note operator for each pair of keys in said proximal and distal row of keys, means for connecting together for unitary operation said like keys in the proximal row and said latter note operators and articulated to have the keys in the proximal and intermediate rows move like distances and require like pressure to operate the same, and means for connecting together for unitary operation said like keys in the distal row and said latter note operators and articulated to have the keys in the distal row move like distances and require like pressure as the keys in the proximal and intermediate rows, said means for connecting together the keys in the proximal row with the latter-mentioned note operators comprise rods connected with the inner ends of the keys and connected with said note operators, and said means for connecting the keys of the distal row with the latter-mentioned note operators comprise rods connected with the keys of the distal row and connected with elements in turn connected with the inner ends of the keys of the proximal row, said elements comprising rods mounted upon the inner ends of the keys of the proximal row and having loop portions engaged by the rods from the keys of the distal row, and means for resiliently urging the rods engaging through said loop portion against one of the sides of the loop portions.

9. A musical instrument, comprising a keyboard having a proximal row of depressible keys, an intermediate row of depressible keys, and a distal row of depressible keys, a note operator for each key in the intermediate row of keys, means for connecting together for unitary operation said like keys and note operators, a note operator for each pair of keys in said proximal and distal row of keys, means for connecting together for unitary operation said like keys in the proximal row and said latter note operators and articulated to have the keys in the proximal and intermediate rows move like distances and require like pressure to operate the same, and means for connecting together for unitary operation said like keys in the distal row and said latter note operators and articulated to have the keys in the distal row move like distances and require like pressure as the keys in the proximal and intermediate rows, said means for connecting together the keys in the proximal row with the latter-mentioned note operators comprise rods connected with the inner ends of the keys and connected with said note operators, and said means for connecting the keys of the distal row with the latter-mentioned note operators comprise rods connected with the keys of the distal row and connected with elements in turn connected with the inner ends of the keys of the proximal row, said elements comprising rods mounted upon the inner ends of the keys of the proximal row and having loop portions engaged by the rods from the keys of the distal row, and means for resiliently urging the rods engaging through said loop portion against one of the sides of the loop portions, said resilient means comprising under tension acting against the rods which engage through the loop portions.

JOHN H. REUTHER.